United States Patent
Guarin Aristizabal et al.

(10) Patent No.: US 10,921,434 B2
(45) Date of Patent: Feb. 16, 2021

(54) RADAR SYSTEM

(71) Applicant: NXP B.V., Eindhoven (NL)

(72) Inventors: Gustavo Guarin Aristizabal, Munich (DE); Ralf Reuter, Landshut (DE); Maik Brett, Taufkirchen (DE)

(73) Assignee: NXP B.V., Eindhoven (NL)

( * ) Notice: Subject to any disclaimer, the term of this patent is extended or adjusted under 35 U.S.C. 154(b) by 147 days.

(21) Appl. No.: 16/014,226

(22) Filed: Jun. 21, 2018

(65) Prior Publication Data
US 2019/0018127 A1    Jan. 17, 2019

(30) Foreign Application Priority Data

Jul. 11, 2017 (EP) ..................................... 17180695

(51) Int. Cl.
| | |
|---|---|
| *G01S 13/34* | (2006.01) |
| *G01S 7/35* | (2006.01) |
| *G01S 13/931* | (2020.01) |
| *G01S 13/32* | (2006.01) |
| *G01S 7/40* | (2006.01) |
| *G01S 13/26* | (2006.01) |
| *G01S 13/58* | (2006.01) |
| *G01S 13/88* | (2006.01) |
| *G01S 13/24* | (2006.01) |

(52) U.S. Cl.
CPC ............... *G01S 13/34* (2013.01); *G01S 7/35* (2013.01); *G01S 7/354* (2013.01); *G01S 7/4008* (2013.01); *G01S 13/26* (2013.01); *G01S 13/325* (2013.01); *G01S 13/583* (2013.01); *G01S 13/88* (2013.01); *G01S 13/931* (2013.01); *G01S 13/24* (2013.01); *G01S 2007/358* (2013.01)

(58) Field of Classification Search
CPC . G01S 7/03; G01S 7/35; G01S 7/4008; G01S 13/02; G01S 13/24; G01S 13/26; G01S 13/28; G01S 13/34; G01S 13/88; G01S 7/00; G01S 13/00; G01S 13/325; G01S 13/756; G01S 13/758; G01S 7/032; G01S 2007/358; H04L 27/04; H04L 27/20; H04L 27/2626; H04L 27/36; H04B 10/5561; H04B 1/0475; H04B 1/40; H04J 13/004
USPC ........ 342/21, 61, 85, 95, 135, 145, 162, 189, 342/192, 196
See application file for complete search history.

(56) References Cited

U.S. PATENT DOCUMENTS 5,252,981 A    10/1993   Grein et al.
5,280,288 A    1/1994    Sherry et al.
(Continued)

FOREIGN PATENT DOCUMENTS

EP    1290470 B1    4/2008

*Primary Examiner* — Olumide Ajibade Akonai
(74) *Attorney, Agent, or Firm* — Rajeev Madnawat

(57) ABSTRACT

A method of detecting an object is disclosed, comprising generating a transmission signal by generating a carrier signal and digitally modulating the carrier signal with a transmission modulation signal, and transmitting the transmission signal. A reflected signal is received, the reflected signal having been reflected from the object, and demodulated to extract a received modulation signal. The received modulation signal is correlated with the transmission modulation signal and a range of the object is determined from the correlation of the received modulation signal and the transmission modulation signal.

18 Claims, 7 Drawing Sheets

(56) References Cited

U.S. PATENT DOCUMENTS

| | | | |
|---|---|---|---|
| 5,757,848 A | 5/1998 | Hogberg | |
| 5,999,119 A * | 12/1999 | Carnes | G01S 7/35 342/135 |
| 6,121,915 A | 9/2000 | Cooper et al. | |
| 2006/0132345 A1 * | 6/2006 | Raz | H03M 1/1235 341/155 |
| 2008/0272956 A1 * | 11/2008 | Pedersen | G01S 13/584 342/107 |
| 2013/0135140 A1 * | 5/2013 | Kishigami | G01S 13/288 342/189 |
| 2014/0266826 A1 * | 9/2014 | Valley | H03M 1/12 341/137 |
| 2015/0204966 A1 * | 7/2015 | Kishigami | G01S 13/02 342/189 |
| 2015/0260835 A1 * | 9/2015 | Widmer | H02J 7/025 342/27 |
| 2015/0285905 A1 * | 10/2015 | Eldar | G01S 7/2923 342/196 |
| 2017/0346468 A1 * | 11/2017 | Okazaki | G01S 13/288 |

* cited by examiner

REPLACEMENT

RADAR SYSTEM

CROSS-REFERENCE TO RELATED APPLICATIONS

This application claims the priority under 35 U.S.C. § 119 of European Patent application no. 17180695.3, filed on Jul. 11, 2017, the contents of which are incorporated by reference herein.

FIELD

The disclosure relates to a radar system for detecting objects, in particular to a modulated radar system.

BACKGROUND

Conventional radar systems transmit modulated or pulsed signals to determine properties of an object, such as range to the object or speed of the object. For example, in frequency modulated continuous wave (FCMW) radar the frequency of a radar signal is modulated, yielding information about range to an object when the radar signal is reflected from the object.

A common problem with FMCW or pulse radar systems is that they are subject to interference either within the radar system (one radar with multiple antennas) or between radar systems (multiple radar with overlapping field of view). Within a radar system the interference can be reduced by implementing time domain multiplexing, but this increases the radar cycle time, which is not an option for some applications. Between radar systems, one way to reduce interference is to synchronize the transition time between systems, but this is only an option for deterministic environments where the user can control the radar cycle time of all the sensors. It will fail in random environments where the user does not have any control of the radar systems, such as an automotive environment where multiple vehicles may be transmitting their own radar signals. An alternative is to use 'detect and repair' algorithms to compensate for interference but these only work for small amounts of interference, and add an additional processing load to the signal processing system.

A further problem, particularly associated with FMCW radar, is performance degradation associated with linearity of the components generating the frequency modulation. In FMCW based radar, the signal is generated with a voltage controlled oscillator (VCO) which can be controlled by an external digital to analogue convertor (DAC) or by a phased locked loop (PLL). Typically the frequency modulation is a function of a linear ramp. Any non-linearities in the ramp will result in degradation of performance, since side lobes are generated close to each detected target, and the floor noise of the system is increased. The resulting side lobes and the increment in the noise floor of the system will mask weak targets that otherwise could be detected. Highly linear VCOs require a larger chip area which increases system costs, and a higher energy consumption is required to maintain linearity of the system, especially for larger bandwidths.

Additional problems associated with such radar systems are the need for a high speed analogue to digital convertor (ADC) for ultra-wide band systems, and only limited ability to change the bandwidth on the fly, for example as needed for multi-mode applications.

SUMMARY

In accordance with a first aspect of the disclosure there is provided a method of detecting an object, the method comprising:
 generating a transmission signal by:
  generating a carrier signal; and
  digitally modulating the carrier signal with a transmission modulation signal;
 transmitting the transmission signal;
 receiving a reflected signal, the reflected signal having been reflected from the object;
 demodulating the reflected signal to extract a received modulation signal;
 correlating the received modulation signal with the transmission modulation signal; and
 determining a range of the object from the correlation of the received modulation signal and the transmission modulation signal.

Correlating the received modulation signal with the transmission signal ensures that the determination of range is based on the signal transmitted by that radar system, removing noise associated with other radar systems. This may be particularly useful, for example, in dense radar environments such as will be encountered by self-driving vehicles. Each vehicle will emit its own radar signal, potentially causing a large amount of interference. The method of the present disclosure helps to overcome this interference by extracting the radar signal of that particular system from a received signal using correlation.

Furthermore, the correlation of the received modulation signal and transmitted signal readily provides an indication of the delay time between the transmitted and received signals, enabling determination of the range between the system and the object.

In some embodiments, the transmission modulation signal may be shaped such that an autocorrelation of the transmission modulation signal comprises or consists of a delta function, or an approximation to a delta function. For example, the autocorrelation may comprise a central peak having an amplitude at least 5× or at least 10× larger than the amplitude of any other peaks in the autocorrelation. The central peak may be a Gaussian function, with a variance of 0.2 or less or 0.1 or less.

If the autocorrelation of the transmission modulation signal comprises a sharp peak, such as a delta function, then a correlation of the transmission modulation signal with the received modulation signal will also yield a sharp peak, if that received modulation signal is the reflection of the transmission modulation signal. This enables easy identification of an autocorrelation (i.e. where the received modulation signal is the reflection of the transmitted modulation signal), and facilitates a more accurate determination of range, as the delay time can be determined from the position of the sharp peak with greater accuracy than for a broader peak.

In some embodiments, the transmission modulation signal may be selected from a set of orthogonal modulation signals, such that a correlation of one signal from the set with a different signal from the set in ideal (noise free) conditions yields a zero-amplitude signal, i.e. the signals in the set are uncorrelated with each other.

If the radar system uses one signal from the set, and any other systems around it use a different signal from the set, the correlation performed by the radar system on received signals will remove or reduce cross-talk between the radar system and the other radar systems.

In some embodiments, the method may comprise:
generating a plurality of transmission signals, wherein each transmission signal is generated by:
generating a carrier signal; and
digitally modulating the carrier signal with a transmission modulation signal, the transmission modulation signal selected from a set of orthogonal modulation signals;
wherein each transmission signal is digitally modulated with a different transmission modulation signal from the set of orthogonal modulation signals such that the transmission modulation signal of each transmission signal is orthogonal to the transmission modulation signals of all the other transmission signals of the plurality of transmission signals; and
transmitting each transmission signal; and
correlating the received modulation signal with each transmission modulation signal;
identifying one or more correlations from the correlations of the received modulation signal with each transmission modulation signal; and
determining a range of the object from the one or more correlations.

Each transmission signal may for example be transmitted by a different antenna, or from the same antenna by time-multiplexing. The method of such embodiments allows a received modulation signal to be split into separate contributions due to reflections of each of the transmitted signals respectively. For example, if a plurality of transmission signals are transmitted, one after the other, and reflected from an object moving towards the radar system such that the reflection of a later transmission signal overlaps with that of an earlier transmission signal, the method allows the received signal to be split into separate contributions from each of the transmitted signals. This may, for example, allow determination of the speed of the object.

In some embodiments, the method may further comprise:
receiving a plurality of reflection signals;
demodulating each reflection signal to extract a received modulation signal from each of the reflection signals;
correlating each received modulation signal with each transmission modulation signal;
identifying one or more correlations from the correlations of each received modulation signal with each transmission modulation signal; and
determining a range of the object from the one or more correlations.

This method provides a multiple input, multiple output (MIMO) radar system. The method allows the reflection of each transmission signal to be reconstructed from each reflected signal. Thus, for example, if three transmission signals are sent and three reflected signals detected, the method effectively generates nine virtual received modulation signals. This may increase the angular resolution of the radar system without having to alter the physical structure of the antennas of the system.

In some embodiments, each transmission signal may be transmitted substantially simultaneously, for example each transmission signal may begin to be transmitted within 1 μs of the other signals. Each transmission signal may be transmitted from a respective antenna, and/or each reflection signal may be received with a respective antenna.

In some embodiments, the method may further comprise determining the speed of the object or the angular position of the object from the correlation or one or more correlations. For example, multiple time-spaced correlations may be determined, and Fourier transformed (e.g. using a fast Fourier transform (FFT) algorithm), to yield the speed of the object.

In some embodiments, modulating the or a carrier signal may comprise modulating the phase, frequency, or amplitude of that carrier signal.

In some embodiments, the or each transmission modulation signal may comprise a repeating signal pattern. In some such embodiments, the method may further comprise digitally sampling the or each received modulation signal at a rate which is lower than the Nyquist sampling rate of that signal (i.e. twice the bandwidth of the signal). By using such a sub-sampling method, ultra-wide bandwidth signals may be used without requiring a fast analogue to digital convertor (ADC). As the signal repeats, the full signal can be sampled from the repeats.

According to a second aspect of the disclosure there is provided a radar system for detecting an object, the radar system comprising:
a carrier signal generator;
a digital modulation signal generator;
a digital modulator configured to generate a transmission signal by digitally modulating a carrier signal generated by the carrier signal generator with a transmission modulation signal generated by the digital modulation signal generator;
a transmitting antenna for transmitting the transmission signal;
a receiving antenna for receiving a reflected signal;
a demodulator configured to extract a received modulation signal from the reflected signal; and
a digital signal processor comprising a correlator, the correlator configured to correlate the received modulation signal with the transmission modulation signal, and wherein the digital signal processor is configured determine a range of the object.

The transmitting antenna may be the same antenna as the receiving antenna.

In some embodiments, the radar system may comprise:
a plurality of digital modulation signal generators, each modulation signal generator configured to generate a separate one of a set of orthogonal modulation signals; and
a plurality of digital modulators, each modulator configured to generate a separate transmission signal by modulating the carrier signal with a transmission modulation signal from a separate one of the plurality of digital modulation signal generators,
wherein the correlator is configured to correlate the received modulation signal with each transmission modulation signal, and wherein the digital signal processor is configured to identify one or more correlations from the correlations of the received modulation signal with each transmission modulation signal, and to determine the property of the object from the one or more correlations.

In some embodiments, the radar system may further comprise:
a plurality of demodulators, each demodulator configured to extract a received modulation signal from a separate one of a plurality of received signals,
wherein the correlator is configured to correlate each received modulation signal with each transmission modulation signal, and wherein the digital signal processor is configured to identify one or more correlations from the correlations of each received modulation signal with each transmission modulation signal, and to determine the property of the object from the one or more correlations.

In some embodiments, the radar system may comprise:

a plurality of transmitting antennas, each transmission antenna for transmitting a separate one of the plurality of transmission signals; and a plurality of receiving antennas, each receiving antenna for receiving a separate one of the plurality of reflected signals.

In some embodiments, the radar system may further comprise an analogue to digital convertor configured to convert the or one of the received modulation signals to a digital signal. The analogue to digital convertor (ADC) may be configured to sample the received modulation signal at a rate lower than the Nyquist sampling rate of that signal. This may allow a low speed ADC to be used to acquire ultra-wide band signals, avoiding the problems of using fast ADCs described above. The radar system may further comprise a track and hold amplifier configured to hold a signal of the received modulation signal and pass the signal to the ADC for sampling.

The radar system may comprise a first ADC and a second ADC, to sample the in-phase and quadrature-phase components of the demodulated received modulation signal respectively.

These and other aspects of the invention will be apparent from, and elucidated with reference to, the embodiments described hereinafter.

BRIEF DESCRIPTION OF DRAWINGS

Embodiments will be described, by way of example only, with reference to the drawings, in which.

Figure 1:
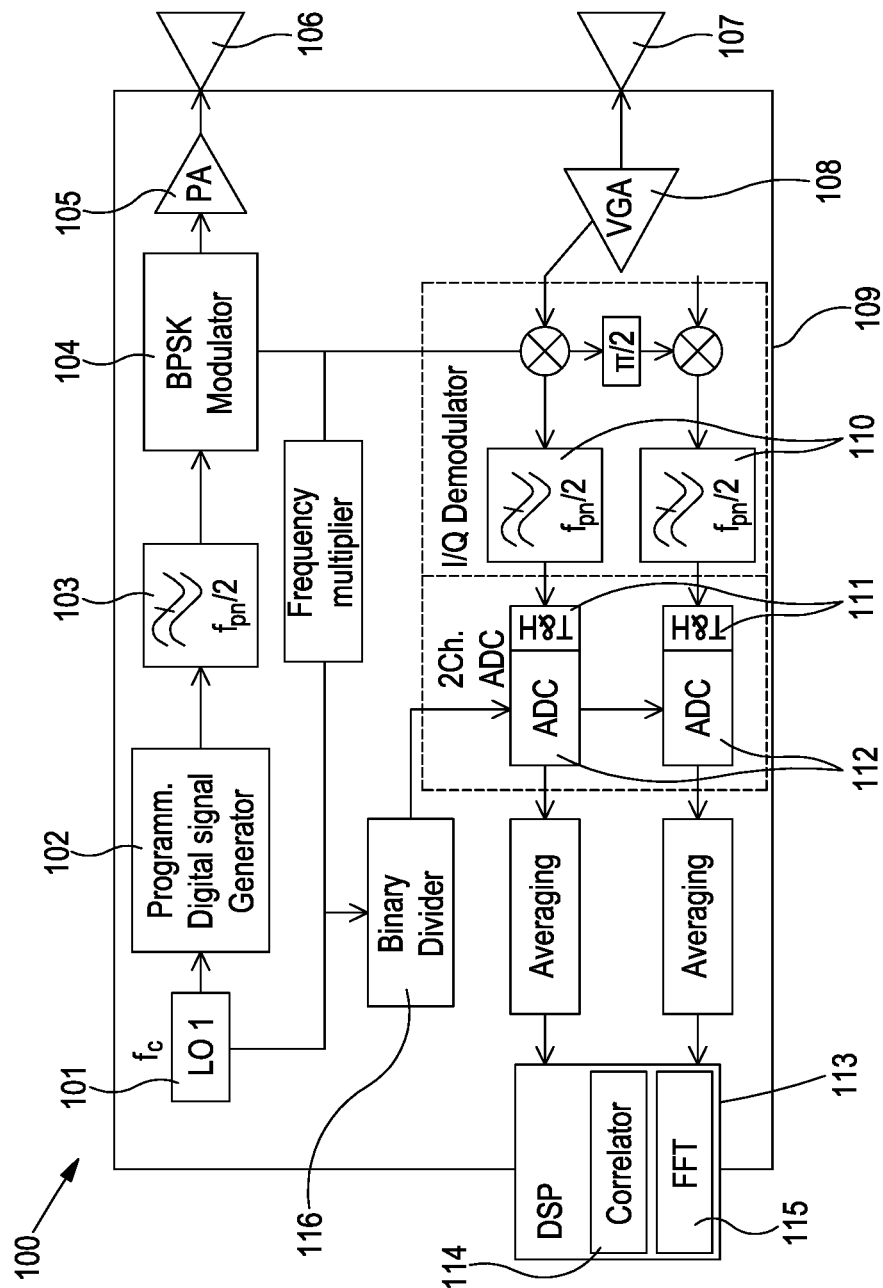
FIG. 1 illustrates an example radar system according to the present disclosure.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar feature in modified and different embodiments.

DETAILED DESCRIPTION OF EMBODIMENTS

FIG. 1 shows an illustration of an example radar system 100 for transmitting and receiving digitally modulated radar signals, based on binary phase-shift keying (BPSK) modulation.

Radar system 100 comprises a digital signal generator 102 driven by local oscillator 101. The digital signal generator 102 generates a transmission modulation signal, which is then filtered by low pass filter 103. The transmission modulation signal is modulated onto a carrier wave using BPSK modulation by a modulator 104. In the illustrated example, the carrier signal is provided by multiplying the output of the local oscillator 101, but in other examples a second local oscillator may be used to generate the carrier signal. Once generated, the modulated signal is amplified by power amplifier 105, and transmitted by antenna 106.

The transmitted signal may be reflected by an object. The reflection is detected as a reflected signal by antenna 107 (which may be the same antenna as antenna 105), and amplified by variable gain amplifier 108. A demodulator 109 is used to extract the modulated signal from the reflected signal. The demodulator 109 is driven by the carrier signal generated by the multiplied local oscillator 101 (or by the second local oscillator, if used), and separately extracts in-phase (I) and quadrature-phase (Q) components of the received modulation signal. After low pass filtering by low pass filters 110, the two components of the received modulation signal are sampled by track and hold amplifiers 111 and analogue to digital convertors (ADC's) 112.

The sampled signals are then passed to digital signal processor (DSP) 113, after optionally averaging over a number of received signals with a coherent adder to increase the signal to noise ratio of the signal. The DSP comprises a correlator 114 and a Fourier transformer 115. The Fourier transformer 115 is described in more detail below.

The correlator 114 cross-correlates the received modulation signal with the transmitted modulation signal (after re-combining the two phase components of the received modulation signal). Correlating the two modulation signals extracts the part of the received modulation signal that is a reflection of transmitted modulation signal, removing contributions from external radar sources, or from other internally transmitted transmissions signals, as described below. The resulting correlation can be used to determine a range to the object.

Figure 2:
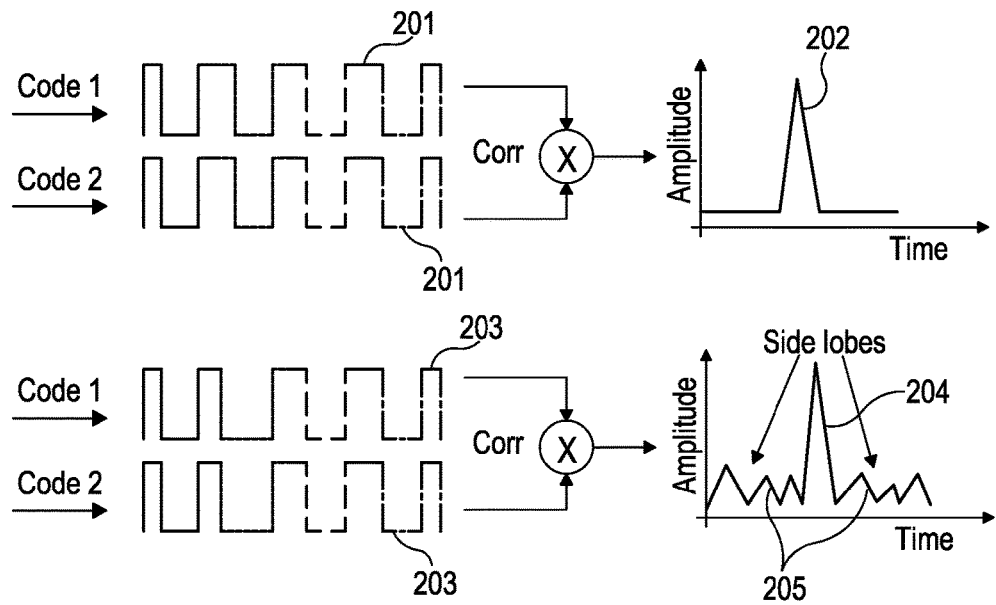
FIG. 2 illustrates the autocorrelation properties of an example transmission modulation signal.

In a preferred embodiment, the transmission modulation signal is shaped such that its autocorrelation function approximates a delta function. The top half of FIG. 2 shows a transmission modulation signal 201 exhibiting an ideal autocorrelation function. When the signal 201 is correlated with itself, the resulting correlation comprises a sharp, central peak 202. When such a transmission modulation signal 201 is used in the radar system 101, and correlated with a reflection of itself in the received modulation signal, the resulting correlation will also comprise a sharp peak. The peak will be centred at a delay time corresponding to the time between transmission and reception of the signals—i.e. the position of the peak identifies the flight time of the reflected signal, from which the distance to the object can be calculated.

Even if a non-ideal signal, such as transmission modulation signal 203, is used, the correlation still comprises a sharp central peak 204, surrounded by side lobes 205. As long as the central peak 204 is significantly larger than the side lobes, for example a factor of 5 or 10 larger, the central peak 204 may still be readily identified. Thus non-ideal modulation signal 203 may still be used in radar system 100 to determine range to the object.

Figure 3:
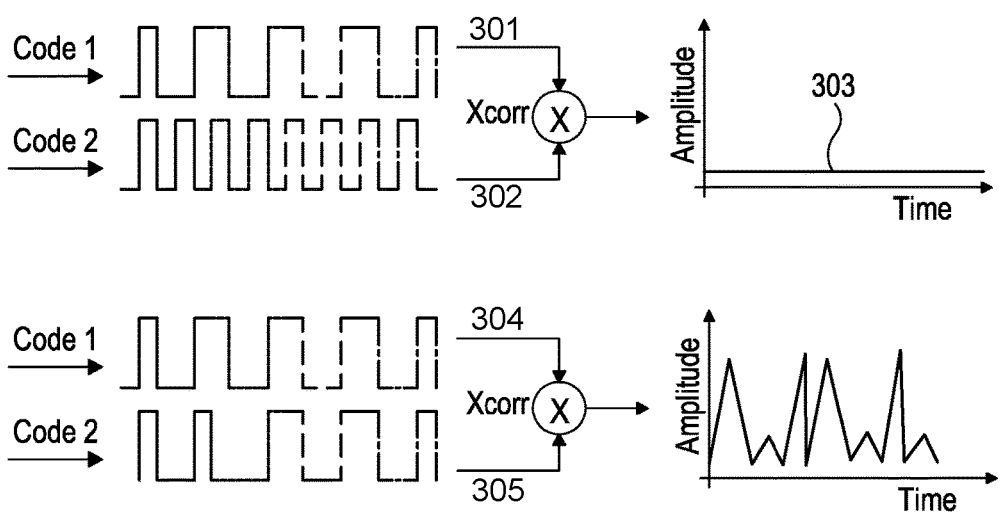
FIG. 3 illustrates the orthogonality of two example signals from a set of transmission modulation signals.

The transmission modulation signal used in system 100 may be selected from a set of orthogonal signals. A cross-correlation of any two different signals 301, 302 in the set of signals produces a zero-amplitude correlation 303, as shown in the top half of FIG. 3. This property is particularly useful if the radar system 100 is used in a radar-dense environment. If all nearby radar systems use a different signal from the set to that used by radar system 100, cross-talk between the systems can be avoided. If signals transmitted by any of the other systems are collected by antenna 107, the correlation of the transmitted modulation signal with those collected signals will result in a zero amplitude correlation. As shown in the lower half of FIG. 3, even transmission signals 304, 305 with low orthogonality may be used in radar system 100, as long as any peaks are significantly smaller than the autocorrelation peak of the transmitted modulation signal, e.g. 5× or 10× smaller. Using signals selected from a set of orthogonal signals is also useful when the radar system itself transmits a plurality of transmission signals, as described in more detail below.

Figure 4:
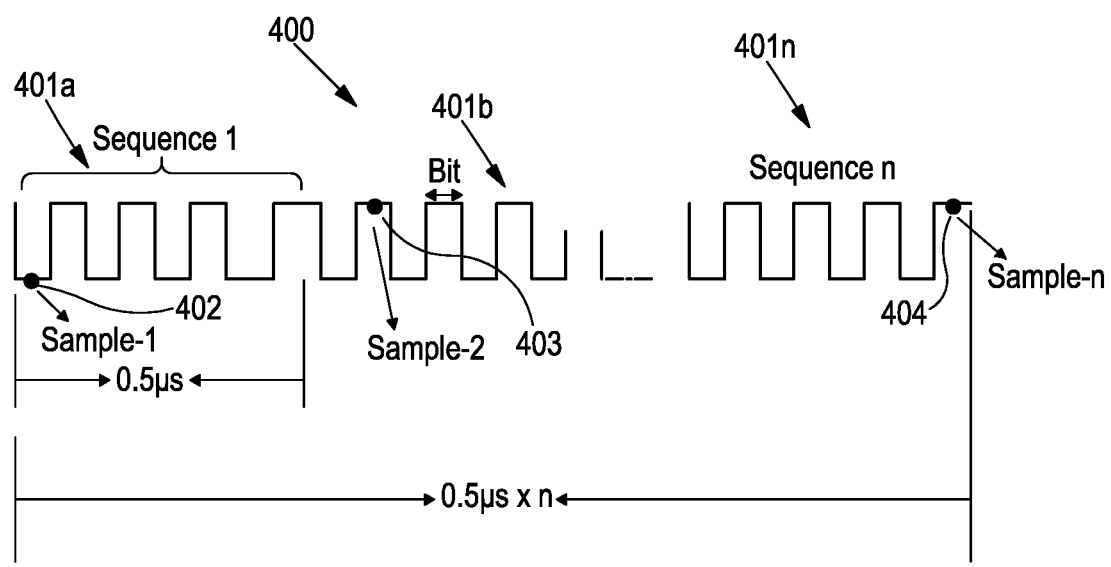
FIG. 4 illustrates an example transmission modulation signal.

As shown in FIG. 4, the transmission modulation signal 400 may comprise a series of repeating sequences 401a-n, for example each of duration 0.5 µs (or each of a duration between 5 µs and 0.1 µs). By repeating the signal n times, the received modulation signal can be subsampled by the ADCs 112, without any loss of data. For example, as shown in FIG. 4, the ADCs 112 sample at point 402 in the first sequence 401a, at point 403 in the second sequence 401b, and at point 404 in the nth sequence, 401n. To achieve this, the ADCs 112 may be driven by a signal from the local oscillator 101, divided in frequency by binary divider 116 by a factor of n. In this way, the full transmission modulation signal can be sampled at a rate below the Nyquist sampling rate (i.e. 2× the bandwidth of the signal), allowing a slower ADC to be used than would otherwise be required. Thus even a low speed ADC may be used to sample an ultrawide bandwidth signal.

Figure 5:
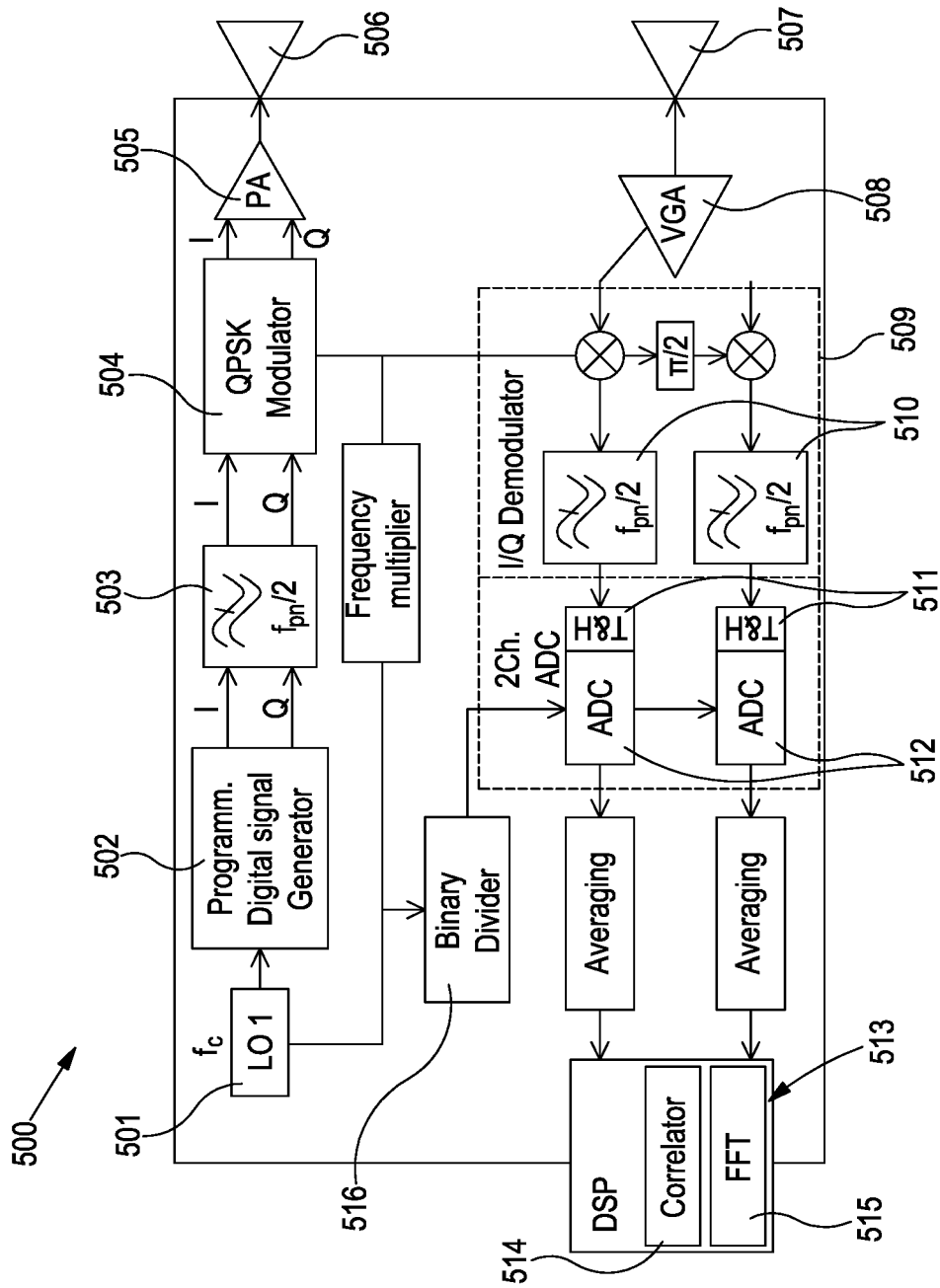
FIG. 5 illustrates an alternative example radar system.

FIG. 5 shows an alternative radar system 500. System 500 is substantially similar to system 100, and similar components in the figure have been labelled with corresponding reference numerals (e.g. local oscillator 501 in FIG. 5 corresponds to local oscillator 101 in FIG. 1 and reference numerals 505-516 in FIG. 5 respectively correspond to reference numerals 102-116 in FIG. 1). In contrast to radar system 100, radar system 500 modulates the digital transmission signal onto the carrier signal using quadrature phase sift keying. The digital signal generator 502 generates both I and Q phases of a digital modulation signal, both of which are filtered by low pass filter 503, and modulated onto the carrier wave by modulator 504. Other than this difference, radar system 500 operates similarly to system 100, receiving reflected signals and correlating the received modulation signals with the transmitted modulation signal.

Figure 6:
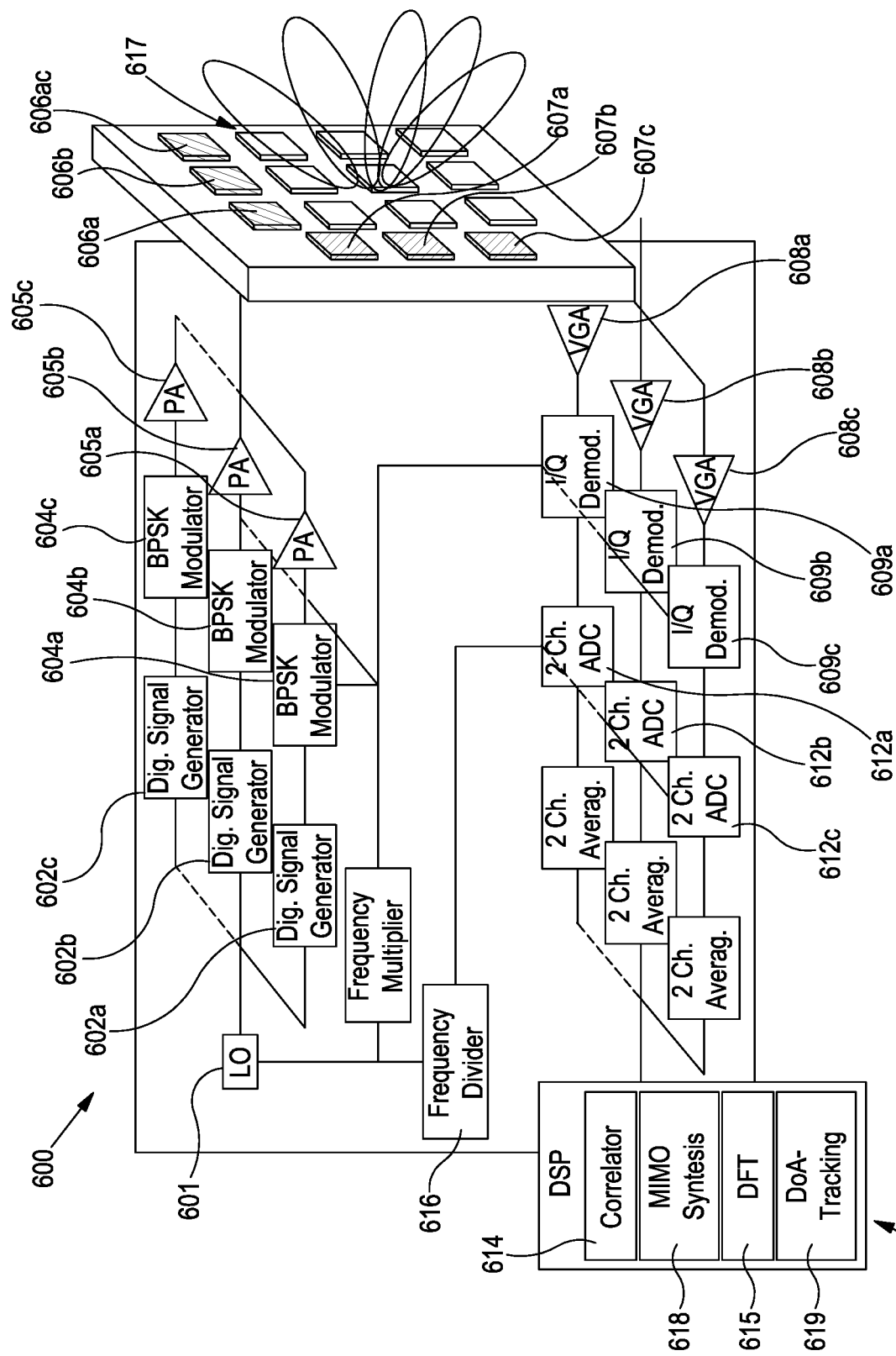
FIG. 6 illustrates a further alternative example radar system.

FIG. 6 shows a further alternative radar system 600, which is a MIMO radar system. Unlike the examples above, where a single transmission modulation signal was transmitted, via a transmission signal, from a single transmitting antenna, radar system 600 generates and transmits a plurality (three, in the illustrated example) of transmission signals from a plurality of transmitting antennas 606a-c. System 600 also receives a plurality (also three, in the illustrated example) of reflected signals through a plurality of receiving antennas 607a-c.

Each of the plurality of transmissions signals is produced substantially similarly to the transmission signal in system 100. A local oscillator 601 drives a plurality of digital signal generators 602 a-c. Each signal generator 602 a-c generates a different signal from a set of orthogonal signals, so that a correlation of any two digital transmissions signals produces a zero-amplitude signal, as shown in FIG. 4. Each generated transmission modulation signal is filtered with a low pass filter (not shown in FIG. 6), and modulated onto carrier waves by respective modulators 604 a-c to generate transmission signals. The transmission signals are amplified by power amplifiers 605 a-c, and transmitted by a respective antenna 606 a-c.

Each receiving antenna 607 a-c receives a reflected signal. Each reflected signal may comprise a combination of the plurality of transmitted signals. After the reflected signals are amplified by variable gain amplifiers 608 a-c, a received modulation signal is extracted from each reflected signal by respective demodulators 609 a-c, filtered by low pass filters (not shown in FIG. 6), and sampled by ADCs 612 a-c via track and hold amplifiers (also not shown in FIG. 6). As in systems 100 and 500, the I and Q phases of the received modulation signals may be separately sampled, and optionally averaged, before being passed to a digital signal processor (DSP) 613.

Digital signal processor 613 comprises a correlator 614. The correlator 614 correlates each received modulation signal separately with each transmission modulation signal. If any part of a received modulation signal is a reflection of one of the transmission modulation signals, the cross-correlation of the received modulation signal with that transmission modulation signal will produce the autocorrelation function. The cross-correlation of that part of the received modulation corresponding to that transmitted modulation signal with any other transmission modulation signal will produce a zero-amplitude signal, due to the orthogonality of the transmission modulation signals.

In this way, the correlator 614 can separately extract reflections of each transmission modulation signal from each received modulation signal, and calculate distance to the object for each signal from the correlations, as described above for system 100. In effect, the radar system 600 has nine distinct virtual receiving antennas 617, without requiring the antenna space of nine physical antennas. A MIMO analyser 618 in the DSP 613 can reconstruct the paths of the transmitted signals as if detected by the virtual antennas 617, and a direction of arrival (DOA) tracker 619 can use this information to calculate the DOA of the reflecting object. The MIMO radar system 600 thus provides increased angular resolution compared to a conventional radar system, without requiring the physical space for a large number of receiving antenna.

Although in FIG. 6 the system 600 comprises three transmitting antenna and three receiving antenna, any number of antennas may be used. The number of receiving antennas need not equal the number of transmitting antennas. For example, three transmission signals may be transmitted by three transmitting antennas, but only one reflected signal may be received by one receiving antenna. The method of correlation described above may be used to extract contributions of each transmission signal to the single received signal.

Figure 7:
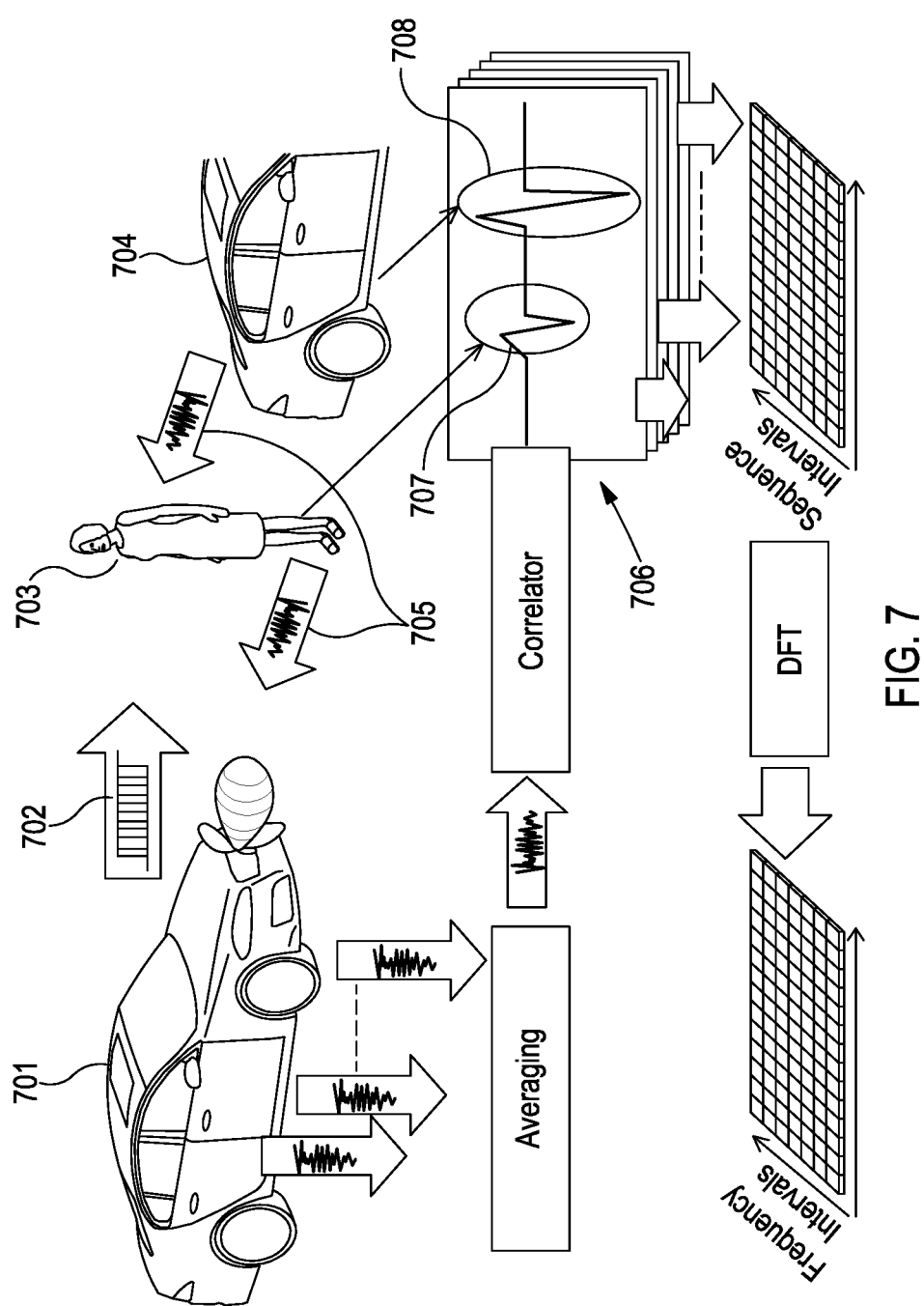
FIG. 7 illustrates a method of determining speed of an object from reflected signals.

DSP 613 also comprises a discrete Fourier transform (DFT) block 618. DFT block 618 may be used to determine the speed of an object, as illustrated in FIG. 7. Fourier transformers and of systems 100 and 500 also perform a similar method to determine speeds of objects.

As shown in FIG. 7, a radar system, in this case incorporated into a vehicle 701, transmits a transmission signal 702. The signal is reflected from objects 703, 704 (in this case a person 703 and another vehicle 704), and the reflected signals 705 are detected by the radar systems. The reflected signals are analysed as described above, yielding correlations 706. FIG. 7 shows the result of one such correlation. A first peak 707 is due to the person 703, who is closer to the vehicle 701 than is the other vehicle 704. The second, later peak 708 indicates the position of the vehicle 704. A plurality of time spaced correlations are determined by transmitting and receiving multiple signals. The results are Fourier transformed, for example using an FFT algorithm, to derive the speed of each object relative to the vehicle 701.

Figure 8:
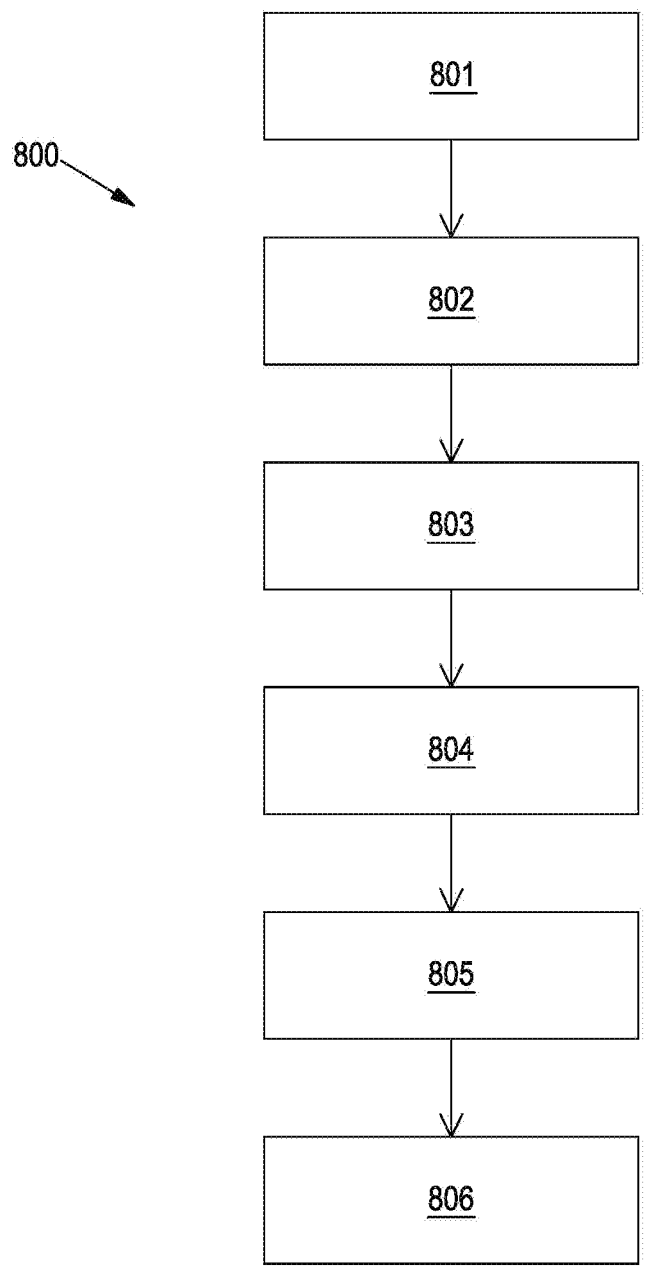
FIG. 8 illustrates a method of detecting objects.

FIG. 8 illustrates a method 800 of detecting an object, for example using a radar system 100, 500, or 600.

At step 801, a transmission signal is generated by generating a carrier signal, and digitally modulating the carrier signal with a transmission modulation signal.

At step 802, the transmission signal is transmitted.

At step 803, a reflected signal is received, the reflected signal having been reflected from the object.

At step 804, the reflected signal is demodulated to extract a received modulation signal.

At step 805 the received modulation signal is correlated with the transmission nodulation signal.

At step 806, a range of the object is determined from the correlation of the received modulation signal and the transmission modulation signal.

From reading the present disclosure, other variations and modifications will be apparent to the skilled person. Such variations and modifications may involve equivalent and other features which are already known in the art of radar systems, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, and reference signs in the claims shall not be construed as limiting the scope of the claims.

The invention claimed is:

1. A method of detecting an object, the method comprising:
   generating a plurality of multi-phase modulated transmission signals by:
     generating a carrier signal; and
     modulating the carrier signal with a plurality of mutually orthogonal transmission multi-phase modulation signals;
   transmitting the plurality of multi-phase modulated transmission signals;
   receiving a plurality of reflected signals corresponding to the plurality of multi-phase modulated transmission signals, the plurality of reflected signals having been reflected from the object;
   demodulating the plurality of reflected signals to extract a plurality of received multi-phase modulation signals;
   correlating each received multi-phase modulation signal with the corresponding transmission multi-phase modulation signal; and
   determining a range of the object from the plurality of correlations of the plurality of received multi-phase modulation signals and the plurality of corresponding transmission multi-phase modulation signals.

2. The method of claim 1, wherein each transmission multi-phase modulation signal is shaped such that an autocorrelation of the transmission multi-phase modulation signal comprises a delta function.

3. The method of claim 1, wherein the plurality of multi-phase modulated transmission signals are transmitted substantially simultaneously.

4. The method of claim 1, wherein each multi-phase modulated transmission signal is transmitted from a respective antenna, and wherein each reflection signal is received with a respective antenna.

5. The method of claim 1, wherein the method further comprises determining the angular position of the object from the plurality of correlations.

6. The method of claim 1, wherein modulating the carrier signal comprises modulating the phase, frequency, or amplitude of that carrier signal.

7. The method of claim 1, wherein each transmission multi-phase modulation signal comprises a repeating signal pattern; and
   wherein the method further comprises digitally sampling each received multi-phase modulation signal at different locations within the corresponding signal pattern for different repetitions of the signal pattern at a rate which is lower than the Nyquist sampling rate of that signal and averaging the samples over multiple repetitions of the signal pattern.

8. A radar system for detecting an object, the radar system comprising:
   a carrier signal generator;
   a plurality of multi-phase modulation signal generators;
   a plurality of multi-phase modulators configured to generate a plurality of multi-phase modulated transmission signals by modulating a carrier signal generated by the carrier signal generator with a plurality of mutually orthogonal transmission multi-phase modulation signals generated by the plurality of multi-phase modulation signal generators;
   one or more transmitting antennas configured to transmit the plurality of multi-phase modulated transmission signals;
   one or more receiving antennas configured to receive a plurality of reflected signals corresponding to the plurality of multi-phase modulated transmission signals;
   a plurality of multi-phase demodulators configured to extract a plurality of received multi-phase modulation signals from the plurality of reflected signals; and
   a signal processor comprising a correlator configured to correlate each received multi-phase modulation signal with the corresponding transmission multi-phase modulation signal, and wherein the signal processor is configured determine a range of the object from the plurality of correlations.

9. The radar system of claim 8, wherein the radar system comprises:
   a plurality of transmitting antennas, each transmission antenna configured to transmit a separate one of the plurality of multi-phase modulated transmission signals; and
   a plurality of receiving antennas, each receiving antenna configured to receive a separate one of the plurality of reflected signals.

10. The radar system of claim 8, wherein each transmission multi-phase modulation signal comprises a repeating signal pattern and further comprising:

a plurality of analogue to digital convertors configured to convert the plurality of received multi-phase modulation signals to a plurality of digital signals;

wherein each analogue to digital convertor is configured to sample the corresponding received multi-phase modulation signal at different locations within the corresponding signal pattern for different repetitions of the signal pattern at a rate lower than the Nyquist sampling rate of that signal; and wherein the signal processor is configured to average the samples over multiple repetitions of the signal pattern.

11. The radar system of claim 8, wherein:

the multi-phase modulation signal generators are digital multi-phase modulation signal generators;

the multi-phase modulators are digital multi-phase modulators;

the multi-phase demodulators are digital multi-phase demodulators; and the signal processor is a digital signal processor.

12. The radar system of claim 8, wherein the plurality of multi-phase modulators are either a plurality of BPSK modulators or a plurality of QPSK modulators.

13. The radar system of claim 8, wherein each transmission multi-phase modulation signal is shaped such that an autocorrelation of the transmission multi-phase modulation signal comprises a delta function.

14. The radar system of claim 8, wherein the plurality of multi-phase modulated transmission signals are transmitted substantially simultaneously.

15. The radar system of claim 8, wherein the signal processor is further configured to determine the angular position of the object from the plurality of correlations.

16. A radar system for detecting an object, the radar system comprising:

a carrier signal generator;

a modulation signal generator;

a modulator configured to generate a transmission signal by modulating a carrier signal generated by the carrier signal generator with a transmission modulation signal generated by the modulation signal generator, wherein the transmission multi-phase modulation signal comprises a repeating signal pattern;

a transmitting antenna configured to transmit the transmission signal;

a receiving antenna configured to receive a reflected signal;

a demodulator configured to extract a received modulation signal from the reflected signal;

an analogue to digital converter configured to sample the received modulation signal at different locations within the signal pattern for different repetitions of the signal pattern at a rate lower than the Nyquist sampling rate of that signal; and a digital signal processor comprising a correlator, the digital signal processor configured to average the samples of the received modulation signal over multiple repetitions of the signal pattern to generated an averaged sampled received modulation signal, the correlator configured to correlate the averaged sampled received modulation signal with the transmission modulation signal, and wherein the signal processor is configured determine a range of the object from the correlation.

17. The radar system of claim 16, wherein:

the modulation signal generator is a digital modulation signal generator;

the modulator is a digital modulator; and the demodulator is a digital demodulator.

18. The radar system of claim 16, wherein the modulation signal is a multi-phase modulation signal.

* * * * *